United States Patent
Hazelton

(10) Patent No.: US 7,053,583 B1
(45) Date of Patent: May 30, 2006

(54) BRUSHLESS DC MOTOR CONTROL

(75) Inventor: Lawrence Dean Hazelton, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/099,876

(22) Filed: Apr. 6, 2005

(51) Int. Cl.
*G05D 13/00* (2006.01)

(52) U.S. Cl. ............ 318/650; 318/138; 318/254; 318/439; 318/560

(58) Field of Classification Search ........ 318/138, 318/254, 439, 700, 432–434, 721, 560–650
See application file for complete search history.

(56) References Cited

U.S. PATENT DOCUMENTS

| | | | | | |
|---|---|---|---|---|---|
| 4,477,757 | A | * | 10/1984 | Palombo et al. | 318/696 |
| 4,528,486 | A | * | 7/1985 | Flaig et al. | 318/254 |
| 5,319,291 | A | * | 6/1994 | Ramirez | 318/254 |
| 5,543,696 | A | * | 8/1996 | Huggett et al. | 318/590 |
| 5,600,218 | A | * | 2/1997 | Holling et al. | 318/439 |
| 5,814,957 | A | * | 9/1998 | Yoshida | 318/439 |
| 5,821,713 | A | * | 10/1998 | Holling et al. | 318/439 |
| 5,929,576 | A | * | 7/1999 | Yasohara et al. | 318/254 |
| 6,369,541 | B1 | * | 4/2002 | Albert | 318/560 |
| 6,400,116 | B1 | * | 6/2002 | Chen et al. | 318/599 |
| 6,469,463 | B1 | * | 10/2002 | Chen et al. | 318/439 |
| 6,528,968 | B1 | * | 3/2003 | Seima et al. | 318/811 |
| 6,624,602 | B1 | * | 9/2003 | Ikegami et al. | 318/254 |
| 6,798,161 | B1 | | 9/2004 | Suzuki | 318/434 |
| 6,836,090 | B1 | * | 12/2004 | Sugiyama et al. | 318/437 |
| 6,838,843 | B1 | | 1/2005 | Imai et al. | 318/254 |
| 6,838,848 | B1 | * | 1/2005 | Shindo | 318/439 |
| 6,888,280 | B1 | * | 5/2005 | Dube et al. | 310/177 |
| 2004/0155613 | A1 | | 8/2004 | Sugiyama et al. | 318/254 |
| 2005/0029972 | A1 | | 2/2005 | Imai et al. | 318/254 |
| 2005/0029976 | A1 | | 2/2005 | Terry et al. | 318/439 |
| 2005/0046371 | A1 | | 3/2005 | Degen et al. | 318/439 |

* cited by examiner

*Primary Examiner*—Marlon T. Fletcher
*Assistant Examiner*—Tyrone Smith
(74) *Attorney, Agent, or Firm*—Jimmy L. Funke

(57) ABSTRACT

A method and control system to control a brushless DC motor to a preferred position is provided. The advantages that accrue to a system employing the method and apparatus to control the brushless DC motor to a preferred position include optimizing response time, energy usage, coil heating, and ability to hold to a fix position. The method to control the brushless DC motor to a position comprises monitoring actual position of the brushless DC motor, monitoring energy used by the brushless DC motor, and determining a commanded position of the brushless DC motor. A zero torque commutation method is employed to control the brushless DC motor to the commanded position only when a time-rate change in the commanded position is less than a first threshold, a difference between the commanded position and actual position is less than a second threshold, and, the monitored energy used is less than a third threshold. A peak torque commutation method is employed to control the brushless DC motor to achieve the commanded position when the time-rate change in the commanded position is greater than the first threshold, the difference between the commanded position and actual position is greater than the second threshold, or the monitored energy used is greater than the third threshold.

11 Claims, 2 Drawing Sheets

BRUSHLESS DC MOTOR CONTROL

TECHNICAL FIELD

This invention pertains generally to a method and system to control a brushless DC motor, and a system that employs a brushless DC motor.

BACKGROUND OF THE INVENTION

A brushless DC motor of the present invention is a brushless DC motor comprising a rotor with an attached permanent magnet, and a stator. The rotor with attached permanent magnet is assembled on a shaft and inserted in the stator, and the rotor and shaft are operable to spin within the stator on one or more bearings, when electrically excited.

Typical applications for a brushless DC motor on a powertrain for a vehicle may include, by way of example, a smart remote actuator for a cruise control system, an actuator and control device for a variable geometry turbocharger, or an exhaust gas recirculation valve actuator.

There are many schemes for controlling a brushless DC motor, depending upon the application of the motor, complexity of the motor, and types of feedback control devices used by the motor, such as position monitoring sensors and current monitoring sensors. Each control scheme employs some form of motor drive circuit comprising a plurality of switches, e.g. transistors, operable to create successive commutation states (i.e., wherein each motor phase is either HIGH, LOW, or, OFF) in electrical windings of the stator, thus inducing successive magnetic fields that cause the rotor with attached permanent magnet to rotate on the shaft. Two typical control schemes for a brushless DC motor include a peak torque commutation method, and, a zero torque commutation method. The peak torque commutation method describes a control system wherein the commutation state is selected so the motor generates maximum possible torque at a desired position. The peak torque commutation method typically comprises a closed loop control algorithm wherein magnitude of electrical current supplied to the brushless DC motor is controlled so motor output torque is balanced against an external mechanical load applied to the brushless DC motor via a motor shaft. A typical peak torque commutation method has a disadvantage when the external mechanical load is relatively low relative to motor effort capability, or output torque capability, of the electric motor. In such situations, the corresponding motor effort, or torque, is low, and therefore a minimal force is able to deflect the motor shaft away from the commanded, or desired, position. This ability to readily deflect the motor shaft away from the commanded position may affect performance of the output device being controlled, and may cause other deleterious effects in the system, such as uncontrolled resonance in the output device. Furthermore, the controller may be unable to maintain the output device at the commanded position if there are sudden changes in the amount of external mechanical load.

The zero torque commutation method describes an open-loop control system wherein the aforementioned commutation state is selected so desired rotational position of the brushless DC motor and motor shaft correlates to the point at which the selected commutation state torque curve is at zero torque. In operation, the motor is able to respond with appropriate opposing force when an external mechanical load is applied to the motor shaft and motor, thus reducing or essentially preventing deflection of the motor shaft. The brushless DC motor generates opposing torque against any load fluctuation, without position-feedback control. A typical zero torque commutation method has a disadvantage that the brushless DC motor operates at less than peak energy conversion efficiency (torque v. motor current).

Therefore, it is desirable to employ a control scheme for a brushless DC motor that is able to selectively use either the open-loop zero torque commutation method or the closed-loop peak torque commutation method, depending upon the specific motor operating conditions, to reduce the ability of an external force to deflect the brushless DC motor and motor shaft from controlled position, while optimizing energy conversion efficiency of the brushless DC motor.

SUMMARY OF THE INVENTION

In accordance with the present invention, a method and control system to control a brushless DC motor to a preferred position is provided. The advantages that accrue to a system employing the method and apparatus to control the brushless DC motor to a preferred position include optimizing response time, energy usage, coil heating, and ability to hold to a fix position.

The method to control the brushless DC motor to a position preferably comprises monitoring actual position of the brushless DC motor, monitoring energy used by the brushless DC motor, and determining a commanded position of the brushless DC motor. A zero torque commutation method is employed to control the brushless DC motor to the commanded position only when a time-rate change in the commanded position is less than a first threshold, a difference between the commanded position and actual position is less than a second threshold, and, the monitored energy used is less than a third threshold. A peak torque commutation method is employed to control the brushless DC motor to achieve the commanded position when the time-rate change in the commanded position is greater than the first threshold, the difference between the commanded position and actual position is greater than the second threshold, or the monitored energy used is greater than the third threshold.

Another aspect of the invention includes a method to control a rotational device to a position, comprising operably attaching the rotational device to an output shaft of a brushless DC motor; and, executing either a zero torque commutation method or a peak torque commutation method to control the brushless DC motor, as described hereinabove.

Another aspect of the invention includes criteria for selecting each of the aforementioned thresholds based upon optimization of energy usage, and to accommodate inertia and/or momentum and other dynamic properties of the motor and external device being positioned.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
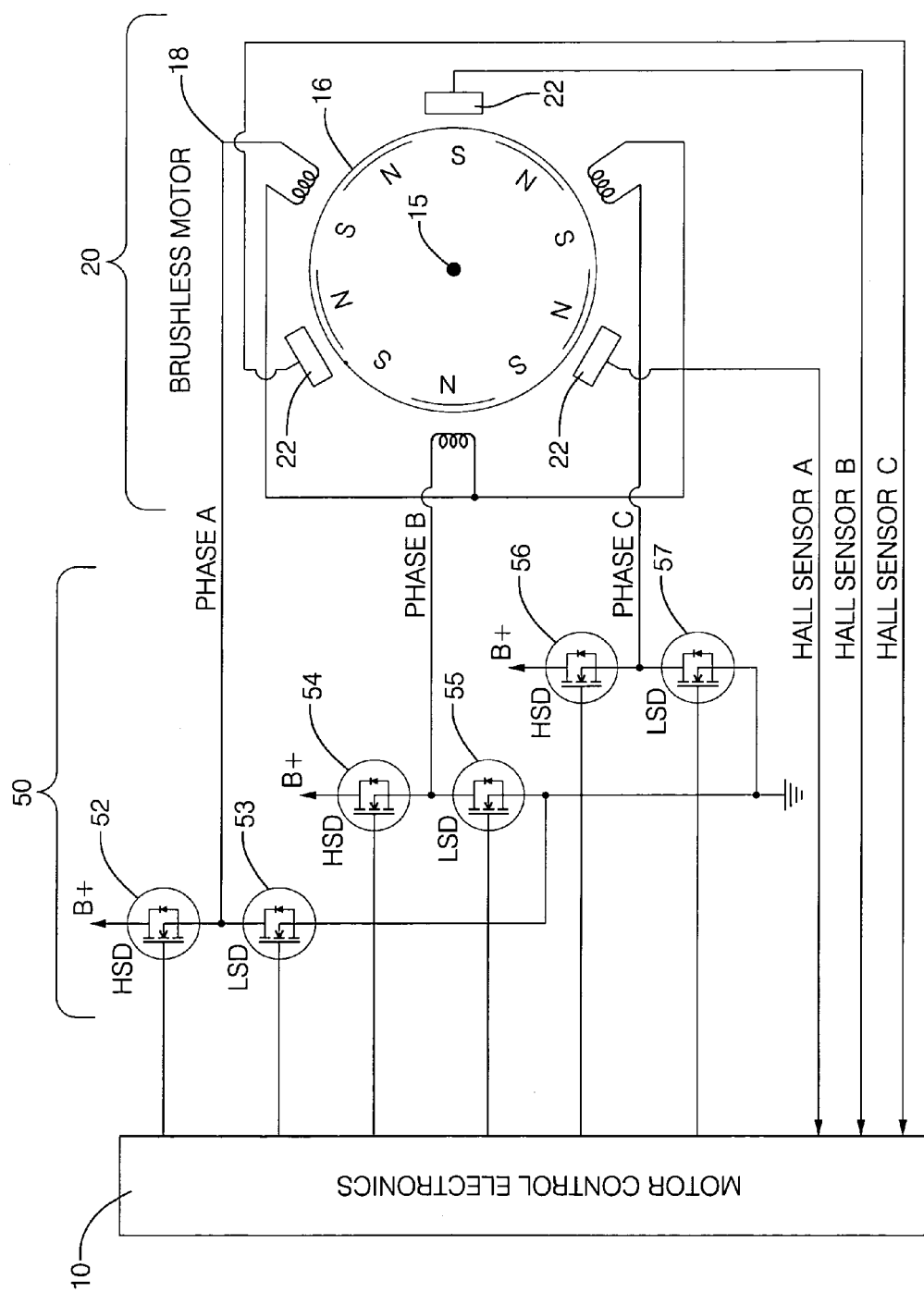
FIG. 1 is a schematic diagram of an exemplary circuit, in accordance with the present invention.

Referring now to the drawings, wherein the showings are for the purpose of illustrating the invention only and not for the purpose of limiting the same, FIG. 1 is a schematic of an exemplary circuit which has been constructed in accordance with an embodiment of the present invention.

The exemplary circuit includes: a brushless motor 20 having an output shaft 15 and at least one position sensor 22; a motor drive circuit 50 comprising a plurality of field-effect transistors ("FET") 52, 53, 54, 55, 56, 57 operable to control electrical current to the stator of brushless motor 20; and, an electronic controller 10, operable to monitor position of the brushless motor 20 based upon input from the position sensors 22, and operable to execute a plurality of predetermined algorithms 80 with calibrated thresholds to control each of the plurality of FETs, thus causing rotation of the brushless motor 20 about the output shaft 15. The output shaft 15 of the brushless DC motor 20 is preferably attached to a device (not shown) using a gearbox (not shown). Rotation of the output shaft 15 translates to rotation of the gearbox (not shown), thus causing a corresponding rotation of the device (not shown). The magnitude of rotation of the device is a function of the rotation of the output shaft 15 and design characteristics of the gearbox, is known to one skilled in the art, and is not discussed in detail hereinafter.

The stator 18 of exemplary brushless DC motor 20 is preferably wired in a 'Y' configuration, and employs a three-phase, full-wave type motor drive scheme. The exemplary brushless DC motor 20 comprises the rotor having shaft 15 with an attached permanent magnet 16, contained within and operable to rotate within the stator 18. The exemplary rotor with attached permanent magnet 16 is a ten-pole magnet 16, having five pole-pairs arranged about an outer circumference of the rotor, adjacent the stator 18. The stator 18 comprises a 3-pole lamination stack with coils, arranged radially at 120 angular degree intervals, with sensors 22 located between each coil. There are thirty commutation state changes possible in this configuration, wherein each commutation state operable to rotate the motor twelve degrees of rotation. When the thirty commutation states are made sequentially, thirty sequential motor steps are executed, causing the rotor to rotate one complete rotation, or 360 mechanical degrees, within the stator 18. The sensors preferably comprise three Hall-effect sensors 22 located within the motor lamination stack of the stator 18, and are operable to detect discrete angular rotation of the shaft 15. Each Hall-effect sensor 22 is located between each the coils in the lamination stack and detect local polarity of the rotor, in conjunction with each of the magnets of the ten-pole magnet 16 of the rotor. Hall-effect sensors 22 are known discrete devices operable to sense a break in a magnetic field, and have an output of either a signal HIGH or a signal LOW, interpretable by the electronic controller 10. In this embodiment, with the exemplary brushless DC motor using a 10-pole rotor and stator with 3-pole lamination stack, the controller 10 is operable to detect a change in signal output for each twelve degrees of rotation of the motor shaft 15. Therefore, the exemplary system is able to control the motor to a resolution of twelve degrees of rotation of the motor shaft 15, also referred to as a motor step of twelve degrees of rotation. The controller 10 is able to detect a corresponding rotation of the device, depending upon the magnitude of reduction by the gearbox. By way of example, when the gearbox has a gear reduction of 100:1, the controller 10 is able to detect a corresponding rotation of the device of 0.12 degrees of rotation.

Referring again to FIG. 1, the motor drive circuit 50 to achieve the three-phase, full-wave type motor drive scheme preferably comprises the plurality of field-effect transistors ("FET") 52, 53, 54, 55, 56, 57 operable to control electrical current to the three-pole brushless motor 20. Each of the three phases is arbitrarily assigned as Phase A, Phase B, or Phase C. Electrical control for each of Phase A, Phase B, and Phase C comprises a pair of the FETs electrically connected in series between system power supply B+, and electrical ground, wherein drain of each FET 52, 54, 56 is electrically connected to system power supply B+; source of each FET 52, 54, 56 is electrically connected to corresponding drain of second FET 53, 55, 57; source of each FET 53, 55, 57 is electrically connected to ground; and gates of FETs 52, 53, 54, 55, 56, 57 are each individually operably electrically connected to the controller 10. Each of FET 52, 54, 56 is referred to as a high-side driver (or, "HSD"), and each of FET 53, 55, 57 is referred to as a low-side driver (or, "LSD").

The electronic controller 10 is operable to monitor position of the brushless motor 20 based upon input from the three Hall-effect sensors 22 located within the motor lamination stack. The controller executes algorithms 80 to determine a magnitude and direction of required motor effort, and drives the motor to a commutation state by controlling each of the plurality of FETs 52, 53, 54, 55, 56, 57 to ON, OFF, or pulse-width-modulated ("PWM").

The electronic microcontroller 32 is preferably an off-the-shelf, low-cost microcontroller powered by a buffered 5 Volt DC power supply. The electronic microcontroller 32 has at least three discrete inputs, each signally electrically connected to one of the Hall-effect sensors 22. It has at least six discrete outputs, each operably electrically connected to a gate of FETs 52, 53, 54, 55, 56, 57, as described hereinabove. Output to each FET is either a discrete ON, or high gate-to-source voltage, a discrete OFF, or low gate-to-source voltage, or a PWM output, wherein the PWM output is at a fixed, predetermined frequency and the PWM duty cycle is varied according to output of the controller. The exemplary microcontroller 32 includes an internal clock with a fixed clock frequency of 4 megahertz ('MHz'), driven by a 16 MHz external resonator (not shown), fixed memory of 8 kilobytes of programmable non-volatile memory (flash EEPROM), and 256 bytes of volatile or random access memory (RAM). The microcontroller 32 is in a small package to minimize space usage. Algorithms described hereinbelow which direct the controller 10 to execute a zero torque commutation method and a peak torque commutation method of controlling the brushless DC motor 20, including a PID control algorithm, are preferably programmed into the programmable non-volatile memory of the microcontroller 32 during manufacturing, and are operable to execute during ongoing operation of the device. The electronic microcontroller 32 preferably executes the control algorithm 80 at least once every three milliseconds and updates the outputs to FETs 52, 53, 54, 55, 56, 57 accordingly. The controller 32 executes an interrupt service routine algorithm each time one of the three Hall-effect sensors 22 generates a signal, to determine position of the rotor 16.

Commutation state comprises each motor Phase A, Phase B, and Phase C commanded to one of a HIGH, LOW, or, OFF condition. During normal operation of the exemplary brushless DC motor and control scheme, each motor drive circuit for Phase A, Phase B, or Phase C is operated in a PWM drive mode, an ON mode, or an OFF mode. When operated in the PWM mode the corresponding HSD FET is pulse-width-modulated by the electronic controller 10, and the corresponding LSD FET is turned ON when the HSD is turned OFF, to reduce power loss when the motor current is being re-circulated. When operated in the ON mode, the LSD is powered ON continuously by the controller 10. When operated in the OFF mode, both the HSD and LSD are powered off continuously by the controller 10. The controller determines and executes each operating mode based upon input from the state of each of the three Hall-effect sensors 22 located within the motor lamination stack, the commanded position, and the desired torque direction.

By way of example, a commutation state is described. One commutation state comprises Phase A: PWM, Phase B: ON, Phase C: OFF, wherein electrical current flows into the brushless DC motor at Phase A and out of the motor at phase B. No current flows in the Phase C coil. When the Phase A HSD is on, as a result of the PWM command to ON, current through the motor 20 increases. When the Phase A HSD is turned off, the current through motor 20 decreases but continues to flow for a time, due the inductive nature of the motor coils. At the instant that the Phase A HSD is turned off, the Phase A LSD body diode (not shown) becomes forward-biased and the motor current re-circulates through Phase A LSD, into the Phase A coil, out of the Phase B coil, down the Phase B LSD and back to the Phase A LSD. The phase A LSD is turned on after a brief time to reduce power dissipation by that device and reduce the decreasing ramp rate of the motor current. This alternating of HSD and LSD on is done at the PWM frequency, which is typically fixed. The duty cycle determined by the position control algorithm. The percent duty cycle at which the Phase A HSD is cycled determines the average motor current, in this example. Average motor current is proportional to motor torque.

In this embodiment, there are six possible commutation states, wherein combinations of each of motor Phase A, Phase B, and Phase C are commanded to ON, OFF, or PWM. The commutation pattern is repeated every 360/5 or, each 72 degrees of mechanical rotation, because of the ten-pole, or five pole-paired permanent magnets attached to the rotor. For this embodiment, 72 degrees of mechanical rotation is equals 360 degrees of electrical rotation, i.e. rotation through the commutation states for this exemplary 10 pole rotor embodiment. These values necessarily change for a differently configured motor, e.g. when the number of magnetic poles is greater or lesser than ten poles, or a stator has more or less than three poles.

Figure 2:
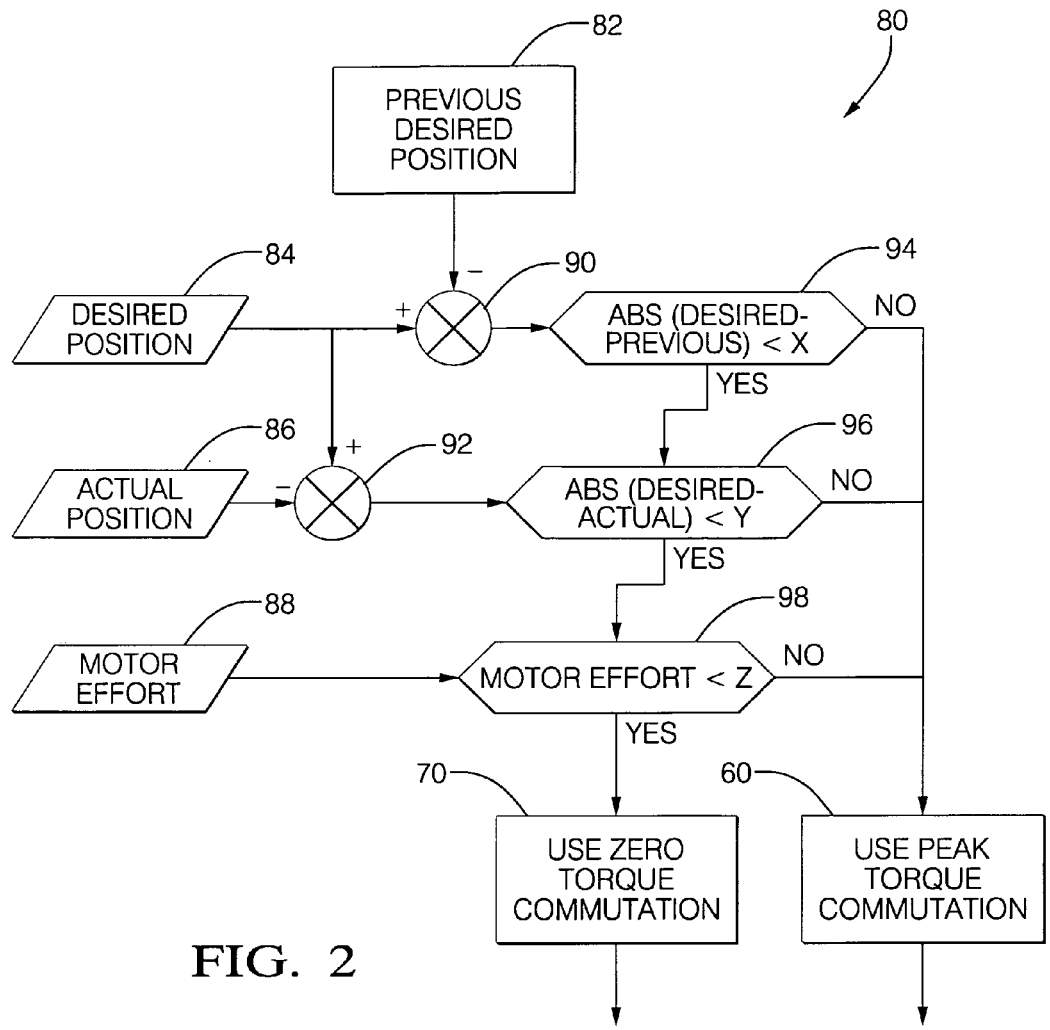
FIG. 2 is a flowchart for a control algorithm, in accordance with the present invention; and, FIG. 3 is an exemplary data curve, in accordance with the present invention.

Referring now to FIG. 2, a flowchart for control algorithm 80, comprising a method to control the brushless DC motor 20 to a predetermined position, is shown in detail. The control algorithm 80 is preferably executed in the microcontroller 10 using known microcontroller instructions, such execution being known to one skilled in the art. The control algorithm is preferably periodically executed typically about every three milliseconds. The control algorithm requires detailed information about the brushless DC motor 20 in order to accomplish the required control thereof. This includes monitoring actual position of the brushless DC motor (Block 86), based upon input from the three Hall-effect sensors 22 located within the motor lamination stack and the commutation state, described hereinabove. The control algorithm preferably determines desired position of the motor (block 84), actual position of the motor (block 86), and previous desired position of the motor (block 82), from a previous iteration of the control algorithm.

Monitoring energy, or motor effort, used by the brushless DC motor preferably comprises determining the duty cycle of the respective FET driver being pulse-width-modulated and system voltage, both which are readily available through the controller 10. The duty cycle of the respective FET driver being pulse-width-modulated is correlatable to average motor current. Therefore energy may be calculated as Energy=Voltage*Current, as is known to one skilled in the art. Furthermore, the average motor current is proportional to motor torque.

Determining commanded, or desired, position of the brushless DC motor (block 84) is specific to an application of the brushless DC motor 20, and typically comprises an input from an external device, such as an engine controller.

The algorithm directs the controller 10 to execute a zero torque commutation method of controlling the brushless DC motor 20 to a commanded position only when all of the following conditions are met: an absolute value of time-rate change in the commanded position is less than a first threshold X (block 94), preferably determined using summing circuit 90; an absolute value of a difference between the commanded position and actual position is less than a second threshold Y (block 96) preferably determined using summing circuit 92; and, the monitored energy used is less than a third threshold Z (block 98).

The first threshold X preferably comprises an amount of change in commanded position per unit time indicating that the brushless DC motor 20 is moving at a slow rate, typically indicating the motor position is at or near the commanded position. By way of example, in this embodiment an initial value for the first threshold X is an amount of change in commanded position per unit time of ten motor steps per second, or a motor rotation of 120 degrees of rotation per second. The first threshold X is calibratable by one skilled in the art to allow optimization of energy usage, and to accommodate inertia and/or momentum and other dynamic properties of the motor and external device being positioned.

The second threshold Y preferably comprises a difference between commanded position and actual position, indicating the actual position is at or near the commanded position, thus permitting transition to the zero torque control scheme to take advantage of the features thereof, or to minimize risk of overshooting the commanded threshold. By way of example, in this embodiment an initial value for the second threshold Y is a difference of two motor steps, or a motor rotation of about 24 degrees. The second threshold Y is calibratable by one skilled in the art to allow optimization of the control system to accommodate inertia and/or momentum, and other dynamic properties of the motor and external device being positioned.

The third threshold Z preferably comprises a determination of the quantity of electrical energy being consumed, typically by monitoring motor voltage and PWM duty cycle, which translates to electrical current, as described hereinabove. By way of example, in this embodiment an initial value for the third threshold Z is a monitored energy usage of about twenty (20%) percent of peak torque of the motor. The third threshold Z is calibratable by one skilled in the art to allow optimization of the control system to accommodate mass and inertia of the motor and external device being positioned.

Alternatively, the algorithm directs the controller 10 to execute the peak torque commutation method (block 60) of controlling the brushless DC motor 20 to achieve commanded position when any of the following situations occur: the time-rate change in the commanded position is greater than the first threshold X (block 94) or, the difference between the commanded position and actual position is greater than the second threshold Y (block 96); or, the monitored energy used is greater than the third threshold Z (block 98).

The zero torque commutation method (block 70) maintains the commanded position of the brushless DC motor 20 regardless of variation in external mechanical load. The motor instantly generates opposing torque against load fluctuations as a result of the zero torque position of the motor that is an inherent electrical characteristic of each commutation state.

Figure 3:
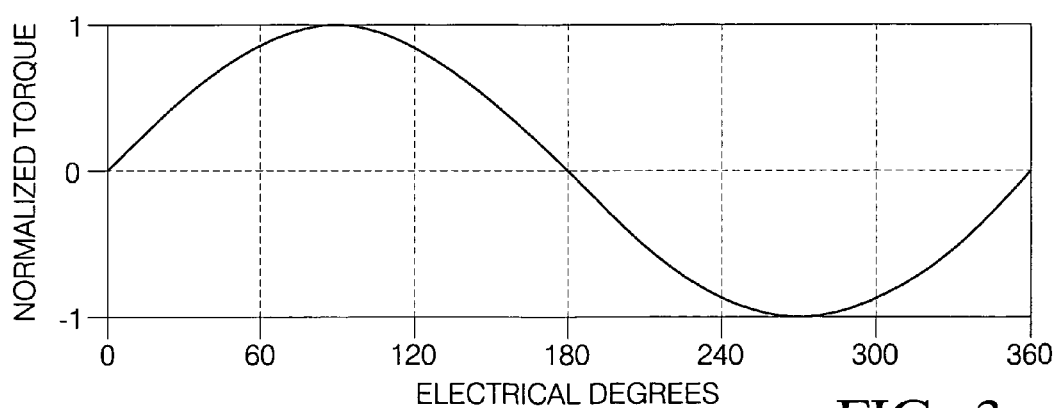

The zero torque commutation method is an open-loop control method, not requiring a position control algorithm to react and exercise control over the system. This is more completely described with reference to FIG. 3. Referring to FIG. 3, an idealized, normalized motor torque curve for the brushless DC motor is shown, wherein an external force is applied to rotate the motor, absent any control scheme. Magnitude of peak torque is proportional to average motor current. When torque curves for each of the above-described six motor commutation states of the exemplary three-phase brushless DC motor 20 are plotted, there are six waveforms similar to that shown in FIG. 3, each shifted 60 electrical degrees from each other. When the brushless DC motor 20 is commanded to rotate or to generate torque in a positive direction, the commutation state is applicable over a range of rotation from 60 to 120 degrees. For negative torque the commutation state is only used from 240 to 300 degrees.

The zero torque commutation method to achieve commanded position preferably comprises selecting a commutation state for the brushless DC motor 20 such the desired rotational position correlates to the point at which the selected commutation state torque curve is at zero torque, as shown with reference to FIG. 3. In this method, motor effort, or PWM duty cycle is fixed at a value determined based upon expected load, and upon a determination of motor's capability to absorb heat generated by current passing through the respective stator coil. The controller 10 causes the rotor and shaft 15 to rotate within the stator 18 by stepping through combinations of commutation states in a predetermined sequence, thus effecting rotation in the commanded direction. The changing states of the Hall-effect sensors 22 confirm that motor motion is occurring. The zero torque commutation method is known to one skilled in the art.

The peak torque commutation method to achieve commanded position preferably comprises a closed loop control algorithm wherein magnitude of electrical current supplied to the brushless DC motor 20 is controlled so motor output torque is balanced against external mechanical load applied to the brushless DC motor 20 via the controlled external device, and transmitted through the gearbox and output shaft 15.

As previously described, the controller 10 executes the peak torque commutation method to achieve the commanded position when conditions for the zero torque commutation method are not met. Hence, the brushless DC motor 20 rotates to move the motor shaft 15 to the commanded position. The aforementioned commutation states are updated based on the state of the Hall-effect sensors 22 and the desired torque direction. Each time a commutation change occurs, a position counter is incremented or decremented to keep track of the position of output shaft 15 of the brushless DC motor 20. Motor effort is determined using a proportional-integral-derivative ("PID") control algorithm, programmed into the microcontroller 10, wherein a difference between the commanded shaft position and actual shaft position is used as input to the PID algorithm. Output of the PID algorithm comprises the PWM duty cycle that drives the motor drive circuit. This operation is regularly calculated by the controller on an ongoing basis, typically every three (3) milliseconds of operation. The second operation comprises electronically reading the state of each of the three Hall-effect sensors 22, calculating the polarity of each stator pole, and determining direction of current through each of the coils of the stator 18 to maximize available torque. This operation is updated, as the rotor 15 rotates, each time one of the three Hall-effect sensors 22 changes state, independently of calculated motor effort. When the brushless DC motor 20 substantially reaches the commanded position, the integrator portion of the PID algorithm varies the motor effort to balance motor torque against the applied external load. The control of the commutation states and the calculation of motor effort (torque) are completely independent operations.

When the brushless DC motor approaches the commanded position, the criteria for the zero torque commutation method are typically met soon thereafter (blocks 94, 96, 98), and the algorithm causes the controller to begin execute the zero torque commutation method (block 70). When the entrance conditions are no longer met, such as when there is a change in the commanded position, the algorithm discontinues operation of the zero torque commutation method, and begins execution of the peak torque commutation method, to achieve the change in the commanded position.

The invention has been described with specific reference to the preferred embodiments and modifications thereto. Further modifications and alterations may occur to others upon reading and understanding the specification. It is intended to include all such modifications and alterations insofar as they come within the scope of the invention. Some specific alternate embodiments may include: employing one or more electrical current sensors to measure motor load; any combination of stator poles and magnet pairs; use of various rotor position sensing devices and methods; up-integrating of the algorithms and control scheme into a more comprehensive controller.

Having thus described the invention, it is claimed:

1. A method to control a brushless DC motor to a position, comprising:
 monitoring actual position of the brushless DC motor;
 monitoring energy used by the brushless DC motor;
 determining a commanded position of the brushless DC motor;
 determining an amount of change in commanded position per unit time;
 employing a zero torque commutation method to control the brushless DC motor to the commanded position only when all of the following conditions are met:
  the amount of chance in commanded position per unit time is less than a first threshold,
  a difference between the commanded position and actual position is less than a second threshold, and,
  the monitored energy used is less than a third threshold; and,
 employing a peak torque commutation method to control the brushless DC motor to achieve the commanded position when any one of the following conditions are met:
  the amount of change in commanded position per unit time is greater than the first threshold,
  the difference between the commanded position and actual position is greater than the second threshold,
  the monitored energy used is greater than the third threshold.

2. The method of claim 1, wherein the amount of change in commanded position per unit time is less than the first threshold comprises an amount of change in commanded position per unit time indicating the commanded position is changing slowly.

3. The method of claim 2, wherein first threshold comprises an amount of change in commanded position per unit time substantially equal to ten motor steps per second.

4. The method of claim 1, wherein the difference between the commanded position and actual position is less than the second threshold comprises the actual position substantially equal to the commanded position.

5. The method of claim 1, wherein the third threshold is substantially equal to twenty percent of peak torque of the motor.

6. A method as in any one of claims 1 and 2, in which employing the zero torque commutation method to control the brushless DC motor to the commanded position comprises: selecting a commutation state for the brushless DC motor such the desired rotational position correlates to the point at which the selected commutation state torque curve is at zero torque.

7. A method as in any one of claims 1 and 2, in which employing the peak torque commutation method to control the brushless DC motor to the commanded position comprises: utilizing a PID control algorithm, wherein input to the PID control algorithm comprises difference between the commanded shaft position and actual shaft position, and output comprises a pulse-width-modulated duty cycle operable to drive the motor drive circuit.

8. The method of claim 1, wherein monitoring energy used by the brushless DC motor comprises: monitoring a voltage and a current delivered to a stator pole of the brushless DC motor.

9. The method of claim 8, wherein monitoring current delivered the stator pole of the brushless DC motor comprises monitoring duty cycle of a pulse-width-modulated signal output to the stator pole.

10. A method to control a rotational device to a position, comprising,
  attaching operably the rotational device to an output shaft of a brushless DC motor; and,
    controlling the brushless DC motor to a position, comprising:
  monitoring actual position of the brushless DC motor;
  monitoring energy used by the brushless DC motor;
  determining a commanded position of the brushless DC motor;
  determining an amount of change in commanded position per unit time;
  employing a zero torque commutation method to control the brushless DC motor to the commanded position only when all of the following conditions are met:
    an amount of chance in commanded position per unit time is less than a first threshold,
    a difference between the commanded position and actual position is less than a second threshold, and,
    the monitored energy used is less than a third threshold; and,
  employing a peak torque commutation method to control the brushless DC motor to achieve the commanded position when any one of the following conditions are met:
    the amount of change in commanded position per unit time is greater than the first threshold,
    the difference between the commanded position and actual position is greater than the second threshold,
    the monitored energy used is greater than the third threshold.

11. A control system for controlling a brushless DC motor to a position, comprising:
  the brushless DC motor: wired in a 'Y' configuration, having rotor with a plurality of poles, an output shaft, and, a plurality of position sensors;
  a electronic controller: signally electrically connected to the plurality of position sensors, and, operably electrically connected to the brushless DC motor by way of a motor drive circuit;
  the electronic controller operable to:
  monitor position of the brushless DC motor, based upon input from the plurality of position sensors;
  monitor energy used by the brushless DC motor;
  determine a commanded position of the brushless DC motor;
  employ a zero torque commutation method to control the brushless DC motor to the commanded position only when:
    an amount of chance in commanded position per unit time is less than a first threshold,
    a difference between the commanded position and actual position is less than a second threshold, and,
    the monitored energy used by the brushless DC motor is less than a third threshold; and,
  employ a peak torque commutation method to control the brushless DC motor to achieve the commanded position when any one of the following conditions are met:
    the amount of change in commanded position per unit time is greater than the first threshold,
    the difference between the commanded position and actual position is greater than the second threshold,
    the monitored energy used is greater than the third threshold.

* * * * *